United States Patent [19]

Singer et al.

[11] Patent Number: 5,719,738
[45] Date of Patent: Feb. 17, 1998

[54] CIRCUIT BREAKER REMOTE CLOSING OPERATOR

[75] Inventors: Paul Hamilton Singer, West Hartford; John A. Pollman, Seymour; George R. Ribar, Jr., Windsor; Dennis L. Ericson, South Windsor, all of Conn.

[73] Assignee: General Electric Company, New York, N.Y.

[21] Appl. No.: 363,794

[22] Filed: Dec. 27, 1994

[51] Int. Cl.$^6$ ................................................ H01H 47/02
[52] U.S. Cl. ................................................ 361/196; 361/154
[58] Field of Search ........................ 335/68; 361/152–156, 361/160, 195, 196

[56] References Cited

U.S. PATENT DOCUMENTS

| | | | |
|---|---|---|---|
| 3,116,441 | 12/1963 | Gieffers | 361/154 |
| 3,532,939 | 10/1970 | Aviander | 361/196 |
| 3,558,996 | 1/1971 | Mitchell et al. | 361/142 |
| 3,824,434 | 7/1974 | Boley et al. | 361/142 |
| 4,001,742 | 1/1977 | Jencks et al. | |
| 4,166,989 | 9/1979 | Castonguay et al. | 335/17 |
| 4,658,323 | 4/1987 | Dougherty et al. | |
| 4,672,501 | 6/1987 | Bilac et al. | |
| 4,801,907 | 1/1989 | Kelaita et al. | |
| 5,168,418 | 12/1992 | Hurley et al. | 361/154 X |

*Primary Examiner*—Fritz Fleming
*Attorney, Agent, or Firm*—Richard A. Menelly; Carl B. Horton

[57] ABSTRACT

A remote closing operator is positioned within a circuit breaker enclosure to allow remote operation of the circuit breaker operating mechanism to close the circuit breaker contacts. A closing solenoid and associated logic circuit controls the state of the contact closing springs. The solenoid is energized to initially release the contact closing springs and is later prevented from operation upon any further attempt to release the contact closing springs after the contacts are closed.

3 Claims, 2 Drawing Sheets

CIRCUIT BREAKER REMOTE CLOSING OPERATOR

BACKGROUND OF THE INVENTION

U.S. Pat. No. 4,001,742 entitled "Circuit Breaker Having Improved Operating Mechanism" describes a circuit breaker capable of interrupting several thousand amperes of circuit current at several hundred volts potential. As described therein, the operating mechanism controls the powerful operating springs that open and close the circuit breaker contacts. Once the operating mechanism has responded to separate the contacts, the operating springs must be recharged to supply sufficient motive force to the movable contact arms that carry the contacts.

When operating circuit breakers remote from the circuit breaker enclosure, devices such as holding solenoids, closing solenoids, undervoltage release accessories and the like are used to release the circuit breaker contact closing springs. Such devices are described within U.S. Pat. Nos. 4,301,433; 4,166,989; and 4,301,434. However, with the powerful contact closing springs used within such high-ampere rated circuit breakers, such remote closing devices, per se, are not capable of releasing the contact closing springs while protecting the remote closing solenoid from damage upon repeated attempts to actuate the solenoid after the contact closing springs have already become released.

A further problem involved with remote operation of the circuit breaker closing springs is an attempt to re-close the circuit breaker contacts when the contacts have separated and the closing springs have not become fully charged resulting in a detrimental closing springs "pumping operation" that could damage the solenoid as well as the contacts.

U.S. patent application Ser. No. 08/323,305 entitled "Circuit Breaker Remote Closing Operator" filed on Oct. 11, 1994 describes an arrangement of a pair of first and second solenoids interacting with a pair of corresponding limit switches to prevent pumping as well as to prevent the solenoids from becoming overheated upon immediate operation of the closing springs.

The use of dual solenoids and dual limit switches contributes to increased costs as well as slowing the remote closing operation due to the inertial effects with the mechanical solenoid and limit switch components.

U.S. Pat. No. 4,642,726 describes the use of discrete electronic circuit components connecting with three switches and with the closing solenoid to control the operation of the solenoid.

One purpose of this invention is to provide a remote circuit breaker contact closing springs operator that is capable of rapidly closing the circuit breaker contacts without involving additional solenoids or additional switches to prevent the pumping of the contact closing springs and without materially increasing the electronic circuit components cost.

SUMMARY OF THE INVENTION

A remote closing operator is positioned within a circuit breaker enclosure to allow remote operation of the circuit breaker operating mechanism to close the circuit breaker contacts. A simple logic circuit controls the operation of the closing solenoid to prevent any further attempt to release the contact closing springs after the contacts are closed.

DESCRIPTION OF THE PREFERRED EMBODIMENT

Figure 1:
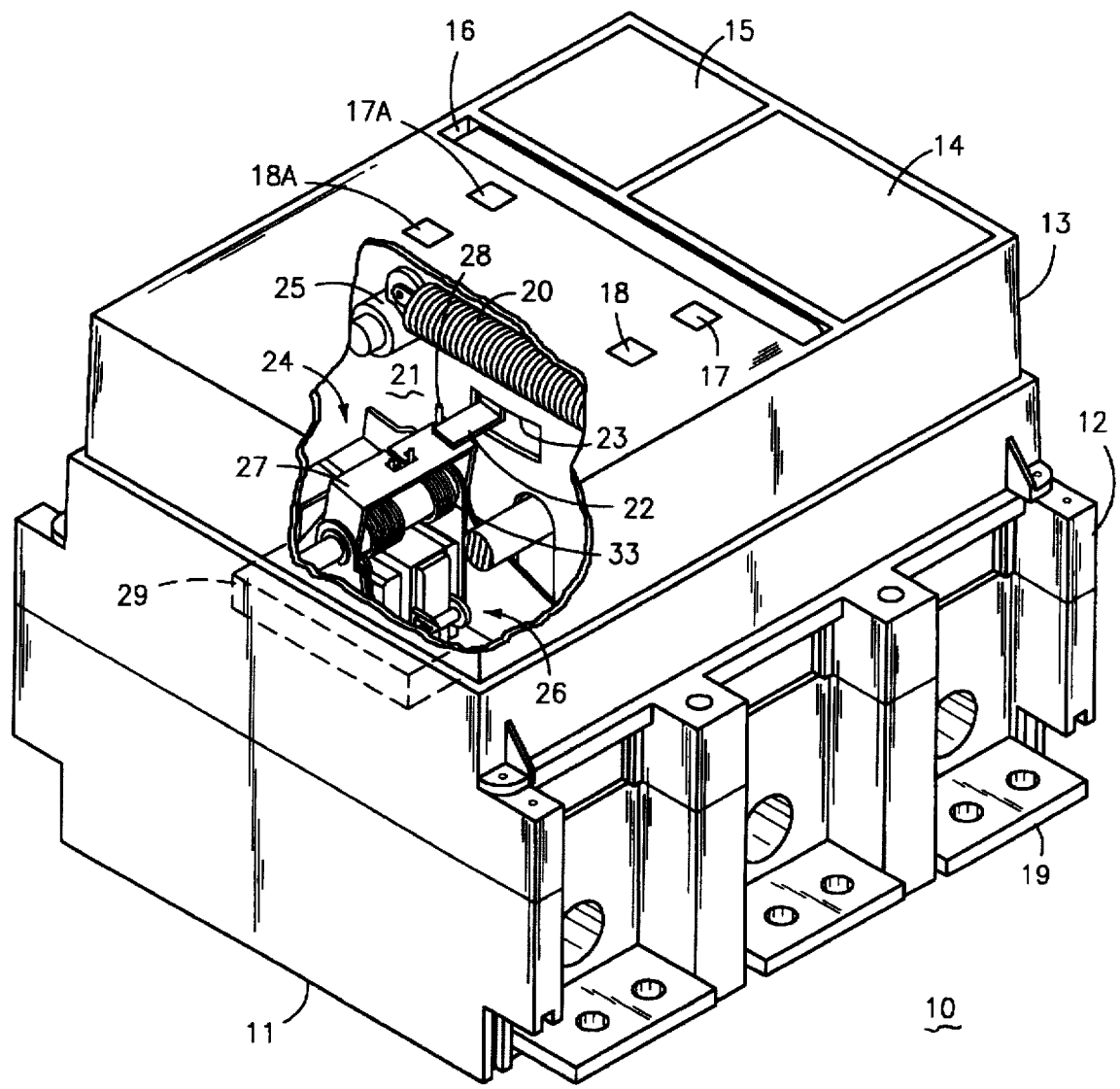
FIG. 1 is a top perspective view of a high ampere-rated circuit breaker with a portion of the circuit breaker cover removed to depict the remote contact closing operator according to the invention.
Figure 2:
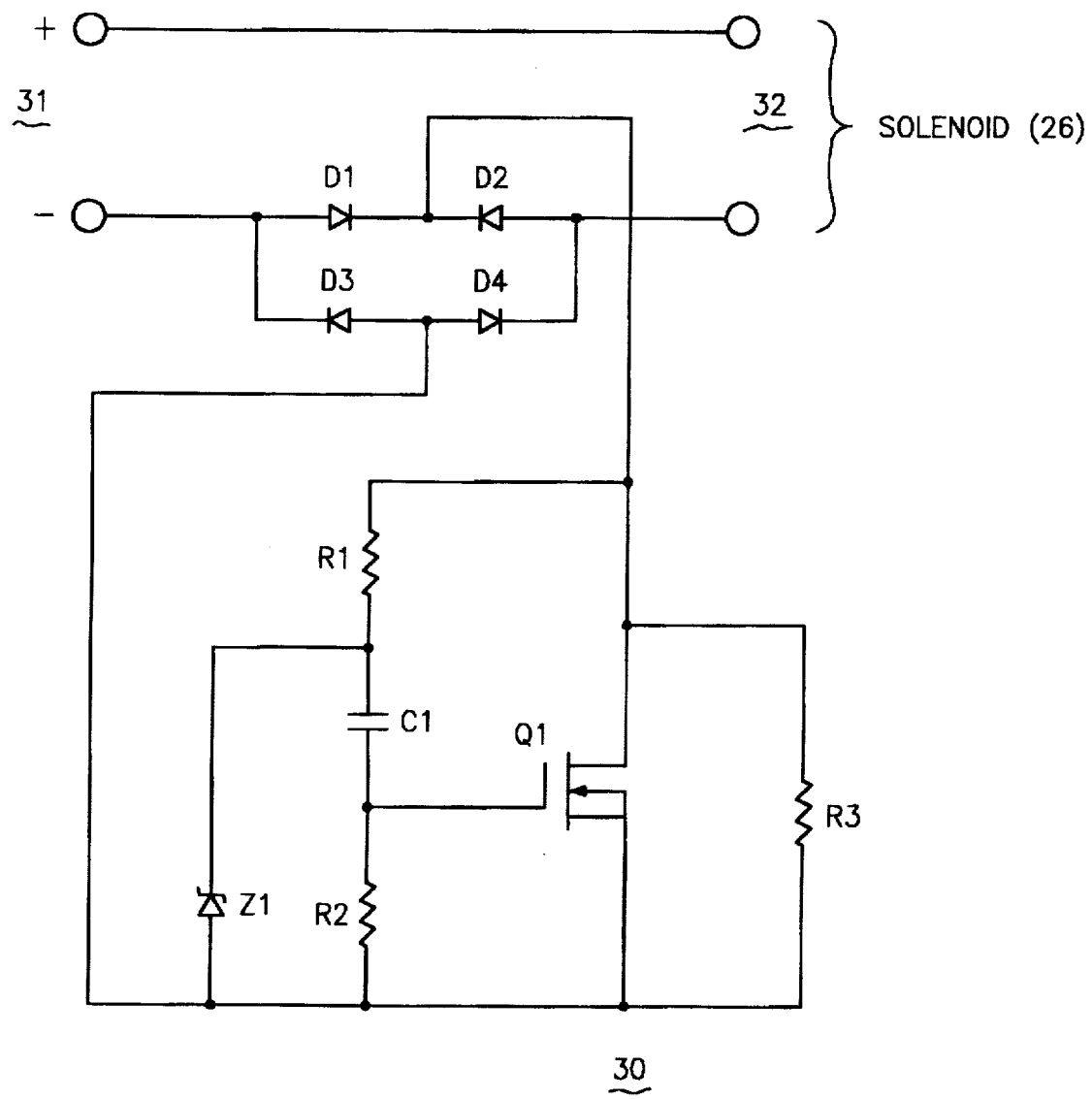
FIG. 2 is a schematic diagram of the logic circuit used with the remote closing operator of FIG. 1.

The high ampere-rated circuit breaker 10 shown in FIG. 1 is capable of transferring several thousand amperes quiescent circuit current at several hundred volts potential. The circuit breaker consists of an electrically insulated base 11 to which an intermediate cover 12 of similar insulative material is attached prior to attaching the top cover 13 also consisting of an electrically-insulative material. Electrical connection with the interior current-carrying components is made by load terminal straps 19 extending from one side of the base and line terminal straps (not shown) extending from the opposite side thereof. The interior components are controlled by an electronic trip unit contained within a recess 14 on the top surface of the top cover 13 The trip unit is similar to that described within U.S. Pat. No. 4,658,323 and interacts further with an accessory within an accessory recess 15 to provide a range of protection and control functions such as described, for example within U.S. Pat. No. 4,801,907. The operating mechanism as described within the U.S. Pat. No. 5,486,667 includes a closing shaft 25 which provides the forces required to charge the powerful operating mechanism contact closing springs 20. The operating handle 16 allows manual operation of the circuit breaker operating mechanism as well as providing manual means for charging the contact closing springs. The operating mechanism components are attached to the operating mechanism sideframe 21 through which the closing shaft 25 extends in the manner described within several of the aforementioned U.S. Patents. The circuit breaker contacts (not shown) are opened by means of the opening button 18 and the OPEN indicating flag is visible under the access slot 18A and are closed by means of the closing button 17 and the CLOSED indicating flag is visible under the access slot 17A. In accordance with the invention, a remote contact closing springs assembly 24 is attached to the sideframe 21 for interacting with the actuator tab 22 that extends through the slot 23 in the sideframe and interconnects with the close button 17 in the manner described within the aforementioned U.S. Pat. No. 5,485,667. The closing solenoid 26 responds to a remote signal and rotates the lever 27 against the bias of the return spring 33 to drive the post 28 upstanding on the lever against the actuator tab 22 to release the closing springs 20 and rotate the closing shaft 25 to close the circuit breaker contacts. The printed circuit board 29 in accordance with the teachings of the invention, carries the logic circuit 30 shown in FIG. 2, to protect the solenoid from overheating and to prevent pumping of the closing springs and operates in the following manner.

Upon application of control power to the input terminals 31, the power is rectified via diodes D1–D4 and is applied to the solenoid via output terminals 32. The combination of the resistor R1 and Zener diode Z1 sets the initial voltage across the storage capacitor C1. Base drive voltage supplied to the base of the FET Q1 via resistor R2 turns on the FET and allows current to flow to the solenoid through output terminals 32. As soon as the voltage across C1 charges to full value, depending upon the time constant value of C1 and R1, the voltage across the base drive resistor R2 drops to zero shutting off the FET and interrupting current flow to the solenoid. Capacitor C1 then discharges through resistor R3 so that the circuit is in condition for receipt of further input power.

The RC time constant values selected for C1 and R1 allow sufficient initial power to the solenoid to overdrive the solenoid for a limited time increment to insure rapid operation of the solenoid without overheating.

A simple control circuit has herein been described for use with a single solenoid to overdrive the solenoid for initial rapid operation and to interrupt power to the solenoid to prevent overheating and pumping of the contact closing springs.

We claim:

1. A circuit breaker for high ampere-rated circuit interruption comprising:

an insulative base;

an insulative cover above said base, said cover enclosing a closing shaft and a closing spring extending from an operating mechanism sideframe;

a closing solenoid interacting with said closing spring for releasing said closing spring and causing said closing spring to rotate said closing shaft;

a logic circuit connecting electrically in series with said solenoid and electrically in series with a source of operating power, said logic circuit including a capacitor for providing said operating power to said solenoid for a sufficient time period to release said closing spring without overheating said solenoid, said logic circuit including an RC circuit for controlling the on time of an electronic switch in series with said solenoid.

2. The circuit breaker of claim 1 wherein said electronic switch comprises a FET.

3. The circuit breaker of claim 2 wherein said capacitor connects with a gate on said FET and with a base drive resistor to turn on said FET initially and to turn off said FET after a predetermined time period.

* * * * *